(No Model.)

2 Sheets—Sheet 1.

R. GLOVER.
MACHINE FOR BENDING BOOT AND SHOE COUNTERS.

No. 292,646. Patented Jan. 29, 1884.

Witnesses:
Fred P Fogg
John E. Bennett

Inventor:
Robert Glover (No Model.)  2 Sheets—Sheet 2.

R. GLOVER.

MACHINE FOR BENDING BOOT AND SHOE COUNTERS.

No. 292,646. Patented Jan. 29, 1884.

Witnesses:
Fred P. Fogg
John E. Bennett

Inventor:
Robert Glover

UNITED STATES PATENT OFFICE.

ROBERT GLOVER, OF LEOMINSTER, MASSACHUSETTS.

MACHINE FOR BENDING BOOT AND SHOE COUNTERS.

SPECIFICATION forming part of Letters Patent No. 292,646, dated January 29, 1884.

Application filed August 20, 1883. (No model.)

*To all whom it may concern:*

Be it known that I, ROBERT GLOVER, of Leominster, in the county of Worcester, of the Commonwealth of Massachusetts, have invented a new and useful Machine for the Purpose of Bending or Shaping Boot and Shoe Counters or Stiffenings; and I do hereby declare the same to be described in the following specification and represented by the accompanying drawings, of which—

Figure 1:
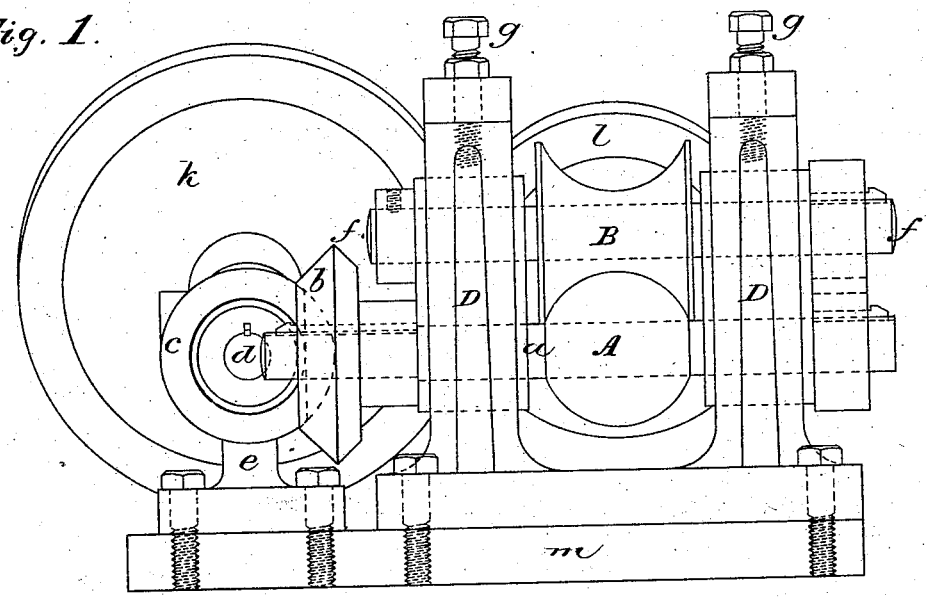
Figure 2:
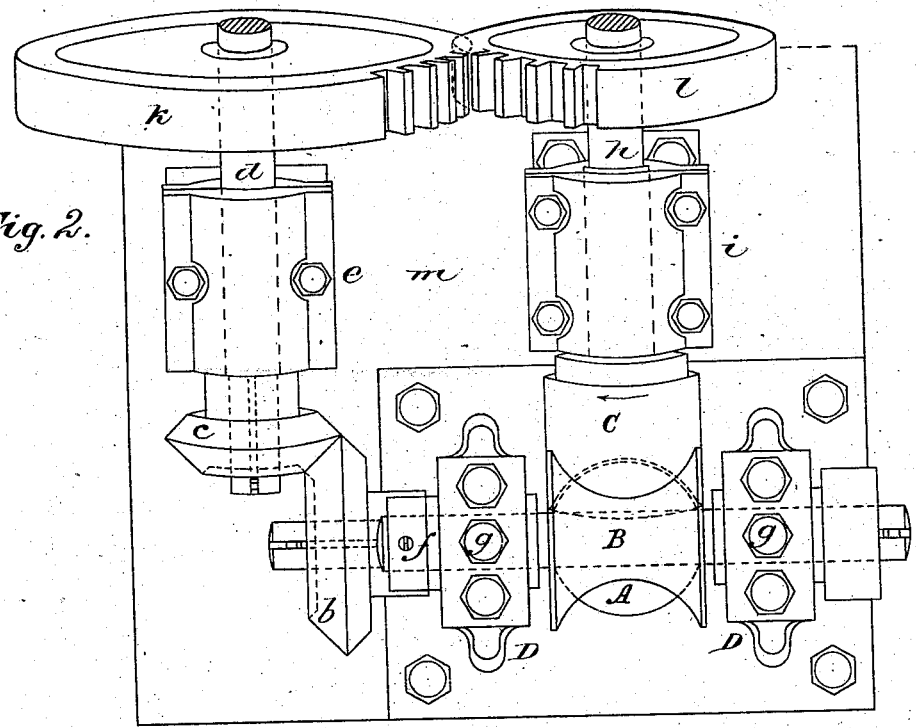
Figure 4:
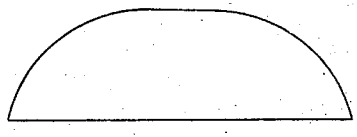
Figure 5:
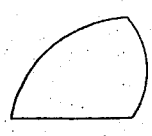
Figure 6:
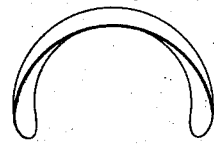

Figure 1 is a front view, Fig. 2 a top view, and Fig. 3 a vertical section, of a machine embodying my invention, the nature of which is defined in the claim hereinafter presented, as well as in the following description. Fig. 4 shows the shape of a counter-blank before it is subjected to the action of the machine, Fig. 5 being an end view, and Fig. 6 a top view, of it as it appears after having been through the machine.

In this machine I have a revoluble sphere and cup and a concave roll arranged and to operate and having mechanism to operate them as follows: This revoluble sphere is shown in each of the figures at A as fixed on a rotary shaft, $a$, which goes through such sphere diametrically thereof, is supported in suitable bearings in two standards, D D, and has fastened upon it, near one end of it, a bevel-gear, $b$. The said gear $b$ engages with a similar gear, $c$, carried by a shaft, $d$, duly supported in and by a box at the upper part of a standard, $e$, arranged as represented.

The concave roll is shown at B as disposed over the sphere A, and as having such sphere extended within the concavity of it (the said roll) in manner as represented, except that in practice their concave and convex surfaces are not in contact, but at a short distance apart. This roll is secured upon a horizontal shaft, $f$, which is arranged directly over the shaft $a$, and supported in suitable boxes movable vertically within the two standards D D. Screws $g$ in the upper parts of the standards serve to limit the upward movements of the said boxes, as occasion or the thickness of the material to be operated on may require.

Directly in rear of the sphere A, and fixed on a shaft, $h$, is the revoluble cup C, which is a cylinder, having in its end next to the sphere a cavity, which is in form the segment of a sphere. The shaft $h$ is supported in a box at the head of a standard, $i$, and like the shaft $d$ is inclined, as represented. These two shafts are furnished with gears $k$ and $l$, to communicate rotary motion from one to the other of such shafts. In practice the shaft $a$ is the driving-shaft of the machine, it being revolved by any suitable means.

Figure 3:
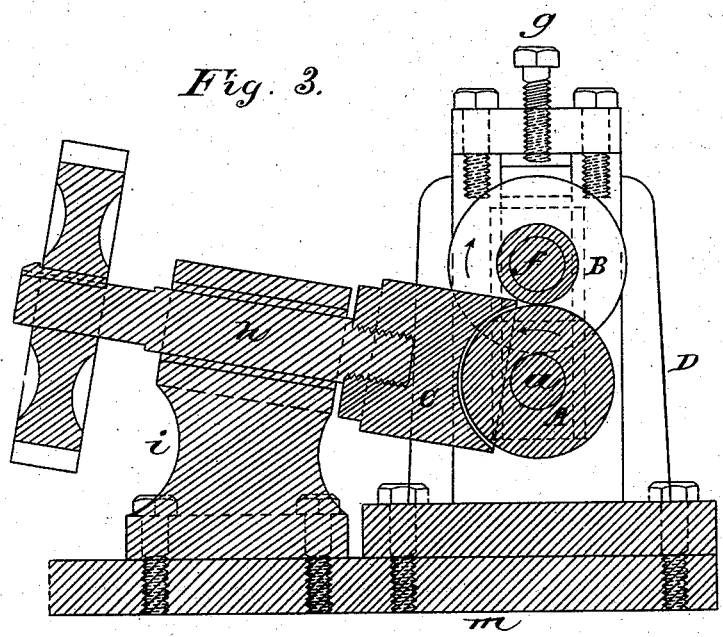

In Fig. 3 the two arrows on the sphere A and roll B indicate the directions in which such sphere and roll revolve when the machine is in operation. So, in Fig. 2, the arrow on the cup C shows the direction of revolution of such cup. The several standards hereinbefore mentioned are represented as having their bases affixed to a plate, $m$.

In the operation of this machine the counter-blank is drawn and passes first between the sphere A and the concave roll B, and by such is curved lengthwise. It next passes down between the sphere and the revolving cup, it being forced downward between them by the sphere. In going down between the sphere and the cup the blank becomes subjected to an action whereby any wrinkles or folds in it are thoroughly removed, and the blank is smoothed and finished to excellent advantage, it finally being discharged by the sphere from between such sphere and the cup.

My machine differs from various other counter-shaping machines in having the revoluble cup and sphere and the concave roll, such other machines having a non-revoluble concave surface or shaper and two revoluble rolls, the said rolls operating to bend the blank longitudinally, while the lower or convex roll, acting with the non-revoluble concave shaper, simply bends the blank transversely without subjecting it at the same time to being smoothed by the action of a concave surface in revolution, as is the case with a blank while being acted on by my improved machine.

I claim—

The improved shoe-counter-shaping machine, substantially as described, consisting of the revoluble sphere, cup, and concave roll, arranged and having mechanism for operating them essentially as set forth, the axes of revolution of the sphere and roll being parallel and that of the cup being at right angles to that of the sphere.

ROBERT GLOVER.

Witnesses:
FRED P. FOGG,
JOHN E. BENNETT.